Feb. 10, 1931. C. E. DAVIS 1,791,662
LOADING APPARATUS
Filed Aug. 11, 1927 5 Sheets-Sheet 4
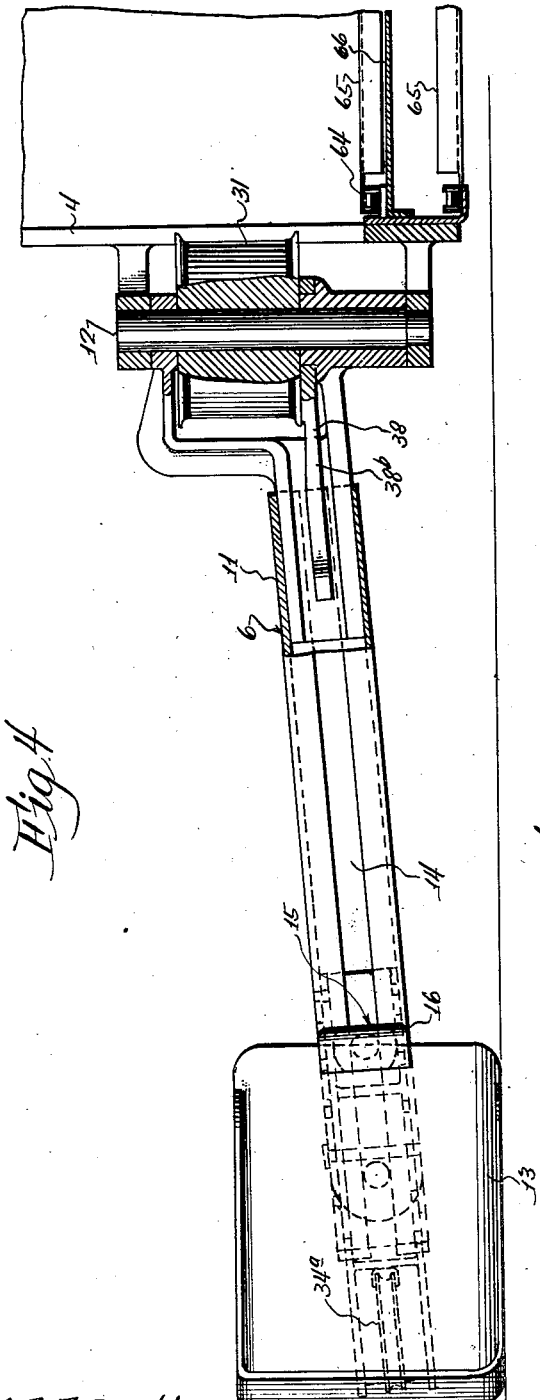
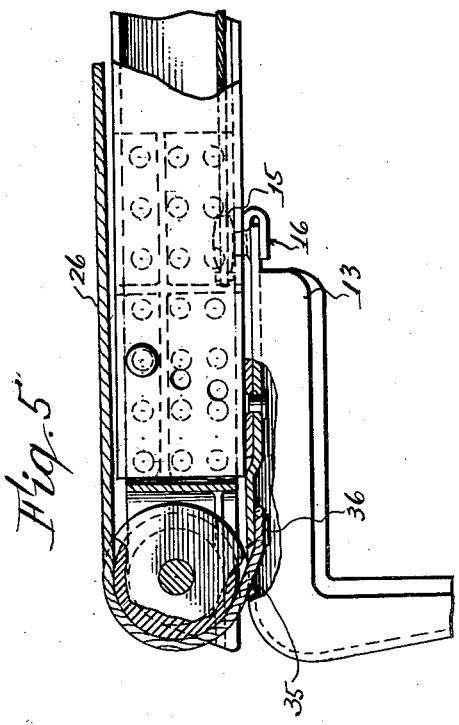
Witness
Herbert Buehler
Inventor
Charles E. Davis
by Clarence F. Poole
Attorney

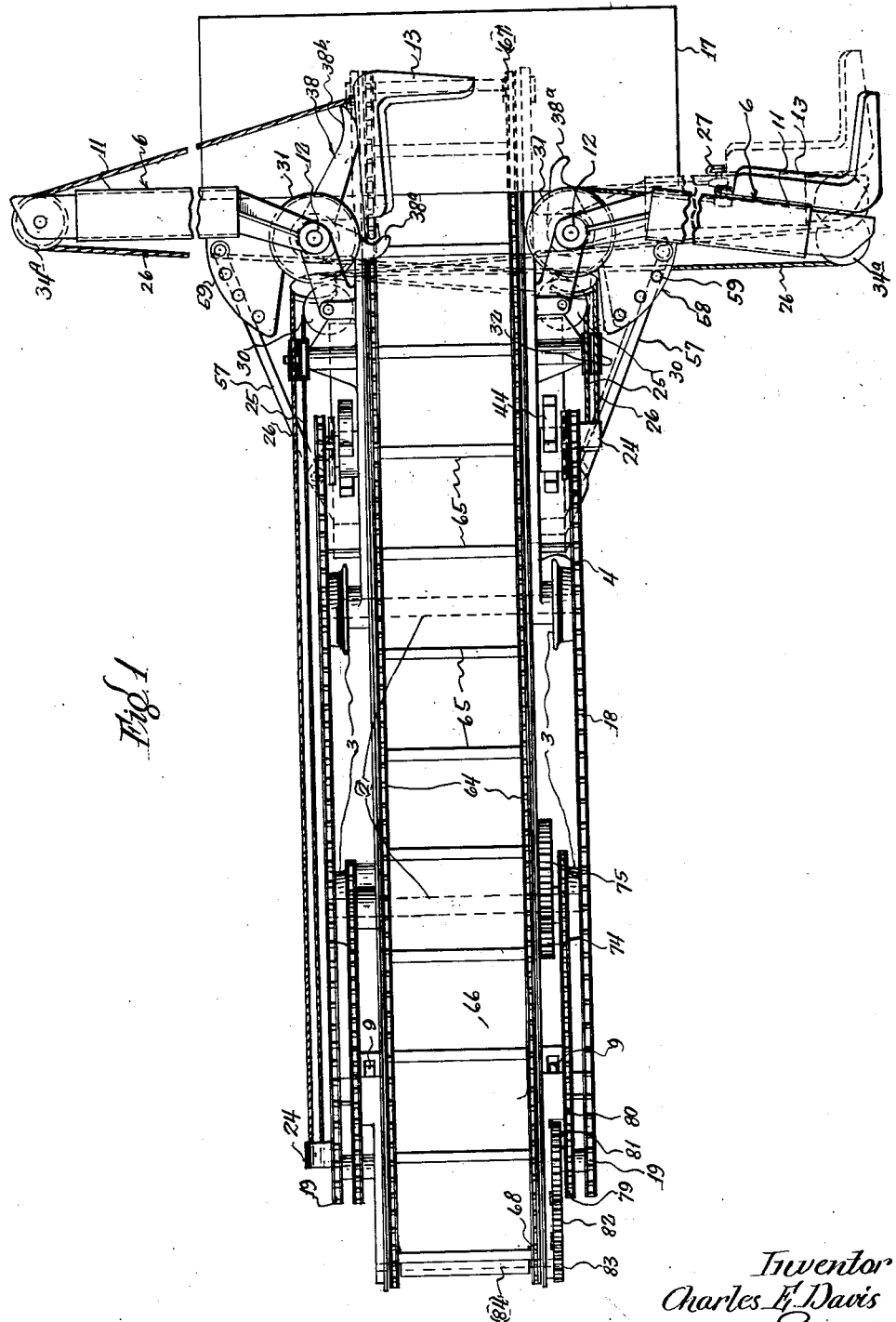

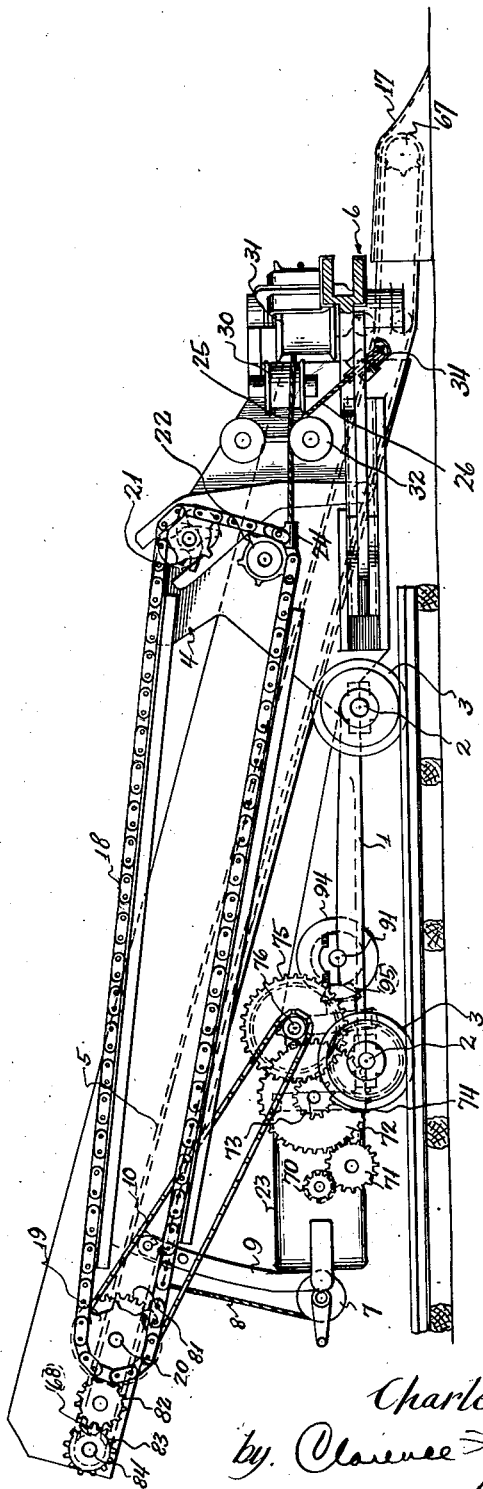

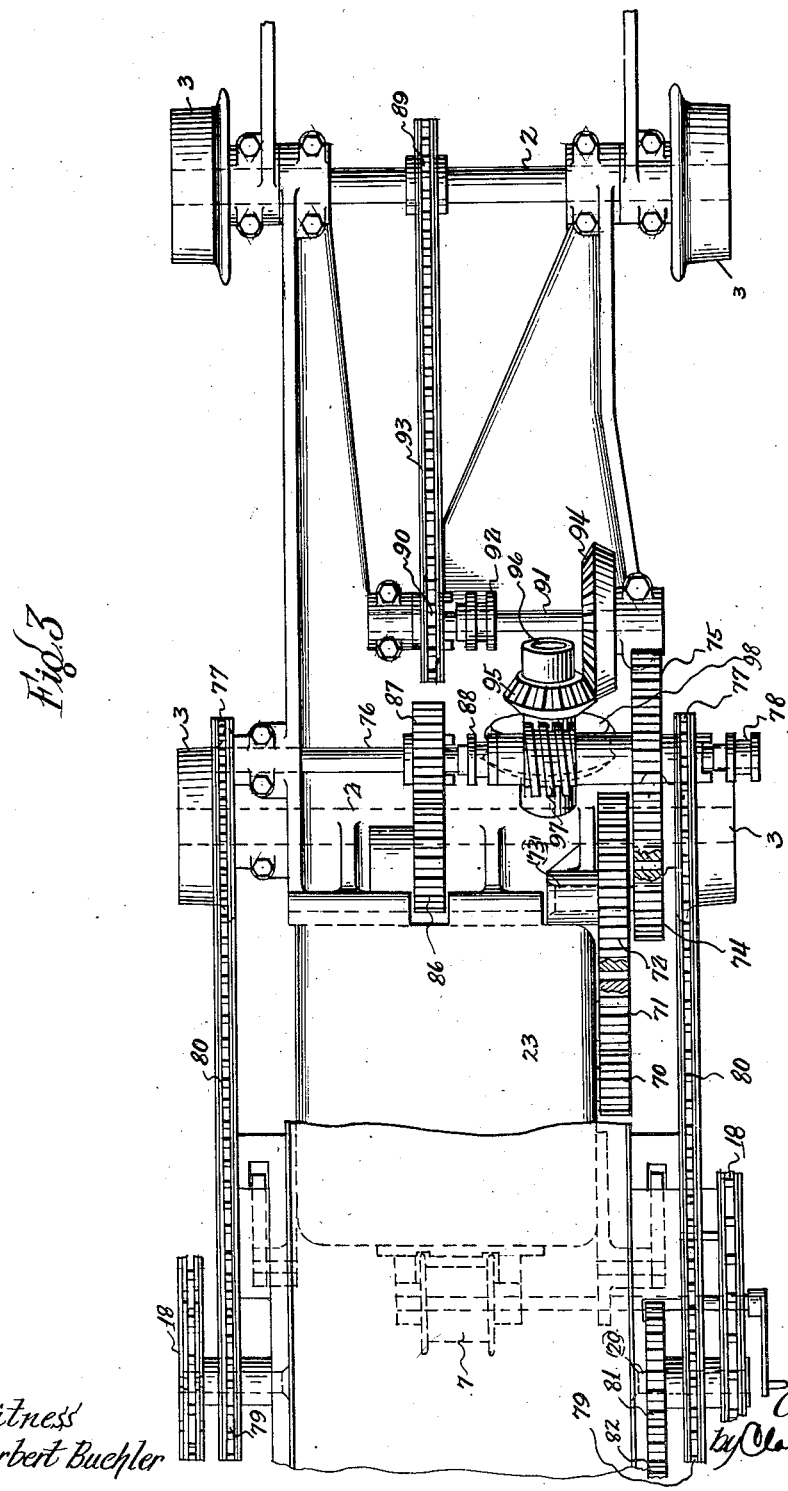

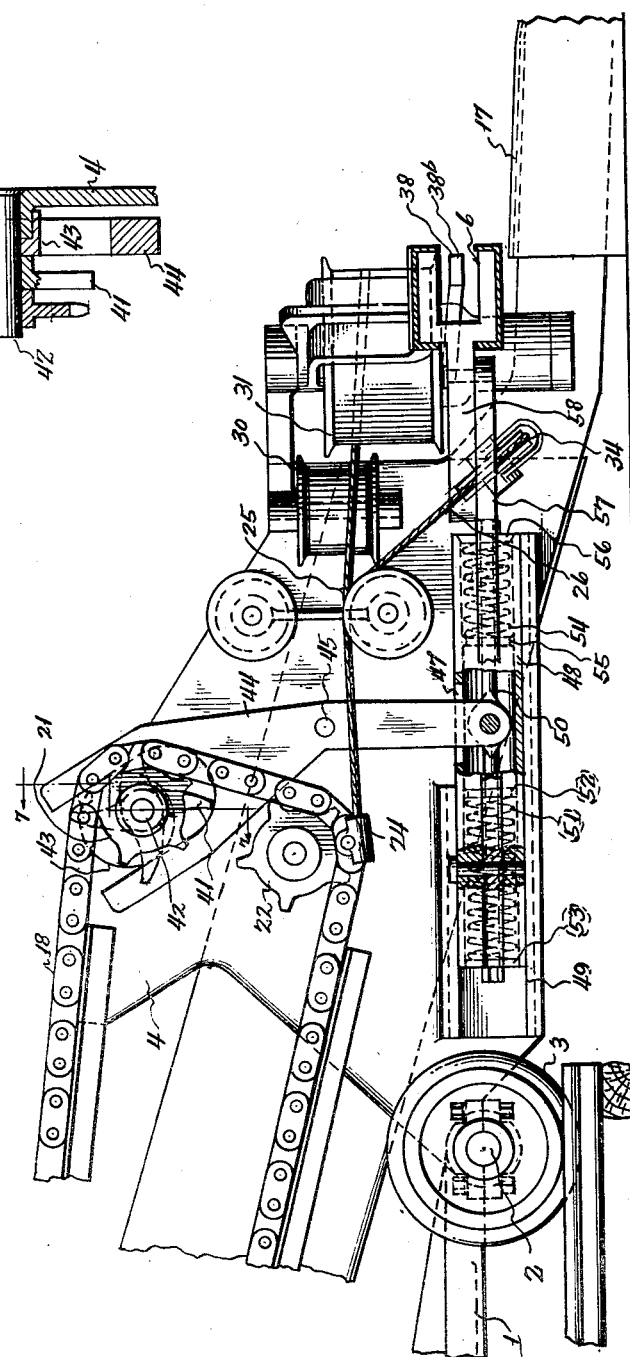

Patented Feb. 10, 1931

1,791,662

UNITED STATES PATENT OFFICE

CHARLES E. DAVIS, OF DAVENPORT, FLORIDA, ASSIGNOR TO GOODMAN MANUFACTURING COMPANY, OF CHICAGO, ILLINOIS, A CORPORATION OF ILLINOIS

LOADING APPARATUS

Application filed August 11, 1927. Serial No. 212,164.

The principal object of this invention is to provide a new and useful apparatus for gathering and loading loose materials in coal mines.

My invention may best be understood by referring to the accompanying drawings, in which:

Figure 1 is a top plan view of the device embodied in my invention;

Figure 2 is a side elevation of the device shown in Figure 1;

Figure 3 is a fragmentary plan view of the device in my invention with parts removed to show the details of the drive gearing;

Figure 4 is an enlarged view of one of the material gathering arms shown in Figure 1;

Figure 5 is a plan view of the forward portion of the arm shown in Figure 4 with parts in section to more clearly show the details of construction;

Figure 6 is an enlarged fragmentary view of the forward portion of the device embodied in my invention; and Figure 7 is a sectional view taken on line 7—7 of Figure 6.

In the embodiment of my invention illustrated, the apparatus is especially adaptable for use in mining operations where the material is to be gathered at the face and loaded in mine cars, the apparatus being especially adapted for use in mine entries or narrow places.

The device includes a truck portion 1 supported on axles 2, 2, and wheels 3, 3, having a frame 4 thereon. The frame 4 supports a conveying element 5 which extends from the ground at an incline longitudinally over said truck portion and has gathering means at the forward end thereof generally indicated at 6.

The frame 4 is pivotally mounted on the forward axles of the truck 1. The weight distribution of the conveying and gathering mechanism is such that the gathering mechanism is normally maintained in contact with the ground. A hand operated rope drum 7 is fastened to the truck 1 and has a rope 8 thereon attached to the rearward portion of the frame 4. The purpose of this rope and rope drum is to move the frame 4 about its pivotal point and raise the forward end of the frame 4 and the gathering and conveying mechanism above the ground when it is desired to move about the mine on the mine rails. A suitable holding device such as a ratchet or any other well known holding means (not shown) may be provided for the drum 7 to hold the frame 4 in any desired position with respect to the frame 1. Auxiliary supports 9 are also provided to support the frame while loading and moving about the mine. Said supports have a series of holes 10 therein through which may be inserted a pin or any other holding means to fit in corresponding holes in the frame 4.

Referring now in particular to the gathering means 6, it may be seen that said gathering means comprises a guide arm 11 pivotally mounted on a vertical shaft 12 which is held in the forward end of the frame 4 on each side of the conveying mechanism 6, and that each of these guide arms have a scraper 13 movable therealong. The guide arms 11 are inclined from the conveying mechanism 5 downwardly toward the ground to provide a means for raising the material gathered from the ground to the conveyor 5. Guides 14 are provided in the guide arms 11 to receive a guide portion 15 projecting outwardly from a plate 16 fixed to the outer portion of the scraper 13. It may here be noted that the plate 16 is placed at such an angle to the scraper 13 as to conform to the angle of incline of the arm 11 and thus keep the scraper in a horizontal position at all points along the guide arms 11. A pan 17 surrounds the forward end and sides of the conveyor 5 near the forward end thereof and is inclined toward the ground from the top portion of said conveyor to provide a means for digging under the loose material and to provide an inclined surface to enable the scrapers 13 to push the loose material into the conveyor 5.

As the scrapers 13 are reciprocably moved in the guide arms 11 said guide arms are reciprocably moved about their pivotal point. This reciprocable movement of the arms is so timed that each arm moves backwards as the scraper starts its outward travel on the arm 11. The purpose of this additional reciprocable movement is to clear the scraper of any loose material which might be in its path on its return journey to prevent scattering of this loose material and to eliminate the use of the excessive power which would be necessary to pull the scraper through this loose material. This reciprocable pivotal movement of the arms 11 is operated and controlled by the mechanism which operates the scrapers 13 and will herein be described in connection with the scrapers 13.

A continuous drive chain 18 (see Figures 1 and 2) is mounted on each side of the frame 4 and extends longitudinally with said frame travelling in a vertical plane. Each chain passes about a sprocket 19 on the rearward portion of the frame 4 and sprockets 21 and 22 on the forward portion of said frame. The sprockets 19 serve as drive sprockets to drive the chains 19 while the sprockets 21 and 22 are merely idler sprockets. The sprockets 19 and chains 18 are driven by a motor 23 on the frame 1 through a suitable reduction drive mechanism which will hereinafter be described.

Attached to each drive chain 18 is a socket 24 pivotally mounted to the side of said drive chain. These sockets hold draft ropes for reciprocably moving the scrapers 13 in the guides 11. A head rope 25 and tail rope 26 are held in each socket. The head ropes 25 pass from the sockets 24 over sheaves 32 around rollers 30 and around direction changing rollers 31 backwards to the forward end of the scrapers 13. Said ropes are fastened to the scrapers 13 at 27 on the guide projection 15 and thus ride in the guides 14. The tail ropes 26 pass from the sockets 24 over sheaves 32 around direction changing sheaves 34, cross near the central portion of the machine, and pass around direction changing rollers on the outer end of the arms 11 on the opposite side of the machine from the socket to which each rope is attached to the rearward portion of the scrapers 13. Said tail ropes pass through an aperture 35 in the scrapers 13 and are attached to said scrapers on their inner surface at 36. The purpose of attaching the tail rope to the inner surface of the scraper is to aid in keeping the said scraper in the guides 14 in the arm 11. It may therefore be seen that the head rope of each scraper is fastened to a drive chain 18 on the same side of the machine as said scraper and that the tail rope for each scraper is fastened to a drive chain on the opposite side of the machine from said scraper. Also when the socket 24 on one drive chain 18 is in one position the socket 24 on the opposite chain 18 is in an extreme opposite position. Therefore as both chains 18 are simultaneously driven by the sprockets 19, it may be seen that power is applied to the head rope for one scraper and released from the tail rope of said scraper and power is also applied to the tail rope of the opposite scraper and released from the head rope of said scraper to pull one scraper inwardly toward the conveyor 5 and pull the opposite scraper outwardly toward the end of the arm 11, and that as the chain completes a half cycle this pull is reversed to pull back the inner scraper and pull in the outer scraper, and thus alternately reciprocate the scrapers 13 in the guide arms 11.

A further means is provided to turn the scrapers 13 to an angle of 90° from their path of travel when they reach the conveyor 5 to cause said scrapers to discharge their load on to the conveyor 5. A member 38 is pivotally mounted on the guide arm 11 at the pivotal point of said guide arm with the frame 4, (see Figures 1 and 4). The member 38 has one arm 38a which normally extends forwardly from the arm 11 and has a hooked portion near the outer end thereof to be engaged by the forward end of the scraper 13. Another arm 38b extends from the member 38 at an angle of 90° to the arm 38a. The arm 38b normally extends outwardly along the arm 11 and is received in the groove 14 of said arm and has its outer end rounded to allow the scraper 13 to pass thereover. As the scraper 13 moved inwardly along the guide arm 11 it passes over the arm 38b and the forward end of said scraper engages the hooked portion of the arm 38a. Pull on the head rope 25 causes the forward end of the scraper 13 to bear against the arm 38a to move the member 38 about its pivotal point and thus engage the arm 38b integral therewith, with the rearward side of the scraper 13. Further pull on the head rope 25 pivots the member 38 about its axis and causes the arm 38b to move the scraper 13 about the axis of said member so said scraper may discharge its load into the conveying means 5.

Referring now to the means for reciprocably moving the arm 11 in coordination with the scrapers 13, as has heretofore been mentioned, said arms are reciprocably moved about their pivotal point by a suitable mechanism actuated by the drive chains 18. Each drive chain 18 has a lug 40 projecting from the inner side thereof. The lug 40 is adaptable to bear against and rotate a star wheel 41 on a stud 42. The star wheel 41 has operative connection with an eccentric 43 on the stud 42 to rotate said eccentric. A lever 44 is pivoted to the frame 4 at 45. Said lever has an upper portion 46 which is forked. The forks of the portion 46 bear against each side of the eccentric 43, to move the lever 44 about its pivotal point on rotation of the eccentric 43. The lower portion of the lever 44 passes through an aperture 47 in a member 48 and is pivoted to a rod 50 which is supported for limited slideable movement in the member 48. The member 48 is in turn movable in guides 49 in the frame 4. The rod 50 has a spring 51 on one end which bears against a projection 52 on the inner surface of the member 48 and bears against a guide plate 53 on its other end. The guide plate 53 is slideable in the member 48 and is held to the rod 50 by a suitable nut threaded thereon. Another spring 54 is placed on the other end of the rod 50. This spring bears against a projection 55 on the inner surface of the member 48 and bears against a guide plate 56 on its other end. It may therefore be seen that as pressure is applied to the springs 51 or 54 through the rod 50 that this pressure will tend to move the member 48 in the guides 49 and that the springs 51 or 54 will take up the shocks due to sudden reversals of pressure or excessive loads on the member 48. A connecting arm 57 is pivotally mounted to the member 48 at one end and is connected to a sector plate 58 at its other end, which in turn is fixed to the arm 11, so movement of the member 48 in the guides 49 will reciprocably move the arms 11 on their pivotal point. A series of holes 59 is provided in the sector plate 58 to adjust the scope of movement of the arms 11. It may now be seen that I have herein provided a means to reciprocably move the arms 11 about their pivotal point as the scrapers 13 reciprocably move on said arms and that the movement of said arms is adjustable with means provided to take care of excessive shocks due to sudden starting, stopping, or reversing of said arms.

The conveyor 5 is a flight conveyor of the ordinary type having chains 64 on each side with flights 65 therebetween which ride on a pan 66. Said chains idle on sprockets 67 at the forward end of the machine and are driven by sprockets 68 on the rearward end of the machine.

Referring now to the means for operating the conveyor, gathering mechanism, and means for moving my device about the mine on its track wheels from the motor 23, it may be seen that said motor is connected to said mechanism through a motor pinion 70. The motor pinion 70 drives an idler pinion 71 which drives a gear 72 keyed to a shaft 73. A pinion 74 keyed to said shaft and driven thereby meshes with and drives a gear 75 keyed to a shaft 76. A sprocket 77 is loosely mounted on each end of said shaft and is operatively connectible therewith by jaw clutches 78. Sprockets 79 are driven by the sprockets 77 by drive chains 80 and are connectible with the sprockets 19 on the studs 20 to drive said sprockets and the drive chains 18 and thus operate the gathering means 6 hereinbefore described. Fixed to the sprocket 19 on the right hand side of the machine is a spur gear 81. The spur gear 81 meshes with and drives a gear 82 which rotates a shaft 84 to drive the sprockets 68 and the conveyor 5.

The track wheels 3 are driven at two speeds. Tramming or high speed is obtained through a gear 86 keyed to the rearward axle 2. Said gear is driven by a gear 87 freely mounted on the shaft 76 and is selectively connectible therewith by a jaw clutch 88. Low speed or feeding speed is obtained through the forward axle 2 through a sprocket 89 keyed to said axle. Said sprocket is driven from a sprocket 90 loosely mounted on a shaft 91 and selectively connectible therewith by a jaw clutch 92, through a drive chain 93. A bevel gear 94 is keyed to said shaft and drives said shaft and is driven by a bevel pinion 95 on a shaft which in turn is driven by a worm 97 keyed to the shaft 79 which drives a worm gear 98 keyed to the shaft 96.

From the description, it may be seen that this specification discloses a machine which is self-propelled and which will gather loose material such as coal and elevate said coal to discharge it into a mine car or any other receptacle.

The forward end of the frame 4 normally bears against the ground while loading but may be raised for travelling about the mine. One speed is provided to move the machine about the mine and another slower speed is used to feed the gathering mechanism into the loose material. Therefore, as the machine is brought up to the loose material or coal which has been recently shot down, the frame 4 is rocked on the pivotal point until the pan 17 engages the mine bottom. The machine is then moved forwardly on slow speed, the pan 17 engaging the loose coal, the gathering and conveying mechanism is started and the scrapers 13 alternatively engage the loose coal, pick it up and empty it into the conveyor 5, said scrapers being drawn backwards as they return for a new load to prevent engaging and scattering the loose material with the returning scraper.

While I have shown one form in which my invention may be embodied, it will be understood that the arrangement and construction of the various parts may be varied or altered without departing from the scope of the invention, or the spirit thereof. Furthermore, I do not wish to be construed as limiting myself to the specific embodiment illustrated, excepting as it may be limited by the appended claims.

I claim as my invention:

1. In a loading machine of the class described, a truck, a frame pivotally mounted on the forward end of said truck, means for rocking said frame on its pivotal point, a conveying mechanism extending longitudinally over said frame and truck, a plurality of gathering devices on the forward end of said frame, means for alternately moving said gathering devices toward and away from said conveying mechanism, and means cooperating with said means for moving said gathering devices toward and away from said conveyor for turning said gathering devices forwardly at right angles to their path of travel into said conveyor.

2. In a loading machine of the class described, a truck, a frame pivotally mounted on the forward end of said truck, means for rocking said frame on its pivotal point, a conveying mechanism extending longitudinally over said frame and truck, and gathering means on each side of the forward portion of said conveying mechanism comprising a transversely disposed arcuately movable guide arm, a draft operated scraper reciprocably movable therealong, and cooperating means for pivotally moving said scraper forwardly towards said conveying mechanism as it reaches the end of the guide arm nearest the conveyor.

3. In a loading machine of the class described, a wheeled truck, a motor, an adjustable frame on said truck, an inclined longitudinally disposed conveying mechanism on said frame, gathering means on the forward end of said frame comprising an inclined guide arm pivotally mounted adjacent each side of said conveyor near the forward end thereof, a draft operated scraper reciprocably movable along each guide arm, and means for operating the draft means for moving said scrapers in said guide arms comprising a continuous flexible drive member on each side of the conveying mechanism, driven by the motor, each drive member having a head rope for one scraper and a tail rope for the opposite scraper connectible therewith.

4. In a loading machine of the class described, a wheeled truck, a motor, an adjustable frame on said truck, an inclined longitudinally disposed conveying mechanism on said frame, gathering means on the forward end of said frame comprising an inclined guide arm pivotally mounted adjacent each side of said conveyor near the forward end thereof, a draft operated scraper reciprocably movable along each guide arm, and means for operating the draft means for moving said scrapers in said guide arms comprising a continuous flexible drive member on each side of the conveying mechanism driven by the motor, each flexible member having a head rope and a tail rope connectible therewith at a common point, the head rope being attached to the scraper on the same side of the machine as said flexible member and the tail rope being attached to the scraper on the opposite side of the machine from said flexible member.

5. In a loading machine of the class described, a wheeled truck, a motor, an adjustable frame on said truck, an inclined longitudinally disposed conveying mechanism on said frame, gathering means on the forward end of said frame comprising an inclined guide arm pivotally mounted adjacent each side of said conveyor near the forward end thereof, a draft operated scraper reciprocably movable along each guide arm, and means for operating the draft means for moving said scrapers in said guide arms comprising a continuous flexible drive member on each side of the conveying mechanism driven by the motor, each flexible member having a head rope and a tail rope connectible therewith at a common point, the head rope being attached to the scraper on the same side of the machine as said flexible member and the tail rope being attached to the scraper on the opposite side of the machine from said flexible member, the point of connection of said ropes to one flexible member being in an extreme opposite position to the point of connection of said ropes to the opposite flexible member.

6. In a loading machine of the class described, a wheeled truck, a motor, an adjustable frame on said truck, an inclined longitudinally disposed conveying mechanism on said frame, gathering means on the forward end of said frame comprising an inclined guide arm pivotally mounted adjacent each side of said conveyor near the forward end thereof, a draft operated scraper reciprocably movable along each guide arm, means for operating the draft means for moving said scrapers in said guide arms comprising a continuous flexible drive member on each side of the conveying mechanism driven by the motor, each flexible member having a head rope and a tail rope connectible therewith at a common point, the head rope being attached to the scraper on the same side of the machine as said flexible member and the tail rope being attached to the scraper on the opposite side of the machine from said flexible member, the point of connection of said ropes to one flexible member being in an extreme opposite position to the point of connection of said ropes to the opposite flexible member, and means to move said scrapers about a vertical axis at the end of said guide arm nearest said conveying mechanism.

7. In a loading machine of the class described, a wheeled truck, a motor, an adjustable frame on said truck, an inclined longitudinally disposed conveying mechanism on said frame, gathering means on the forward end of said frame comprising a transversely disposed guide arm on each side of said conveying mechanism near the forward end thereof mounted for pivotal movement about a vertical pivotal point and inclined toward the ground from said pivotal point, a scraper for each guide arm, said scrapers being alternately and reciprocably moved with respect to each other in said guide arms, draft means for reciprocably moving said scrapers, a continuous drive chain on each side of said conveying mechanism for actuating said draft means, and means for moving said guide arms about their vertical pivotal point in coordination with said scrapers, said means being actuated by the drive chains for actuating said draft means for operating said scrapers.

8. In a loading machine of the class described, a wheeled truck, a motor, an adjustable frame on said truck, an inclined longitudinally disposed conveying mechanism on said frame, gathering means on the forward end of said frame comprising a transversely disposed guide arm on each side of said conveying mechanism near the forward end thereof mounted for pivotal movement about a vertical pivotal point and inclined toward the ground from said pivotal point, a scraper for each guide arm, said scrapers being alternately and reciprocably moved with respect to each other in said guide arms, draft means for reciprocably moving said scrapers, a continuous drive chain on each side of the conveying mechanism for actuating said draft means, and means for moving said guide arms about their vertical pivotal point in coordination with said scrapers, comprising an eccentric on each side of the machine periodically rotatably moved by the drive chains for the scrapers and having connection with said guide arms for reciprocably moving said guide arms through a suitable system of spring cushioned levers.

9. In a loading machine of the class described, a wheeled truck, a motor, an adjustable frame on said truck, an inclined longitudinally disposed conveying mechanism on said frame, gathering means on the forward end of said frame comprising a transversely disposed guide arm on each side of said conveying mechanism near the forward end thereof mounted for pivotal movement about a vertical pivotal point and inclined toward the ground from said pivotal point, a scraper for each guide arm, said scrapers being alternately and reciprocably moved with respect to each other in said guide arms, draft means for reciprocably moving said scrapers, a continuous drive chain on each side of said conveying mechanism for actuating said draft means, means actuated by said draft means for turning said scrapers about a vertical axis when they reach a point adjacent the conveying mechanism, and means for reciprocably moving the guide arms about their vertical pivotal connection with the frame and conveying mechanism in coordination with said scrapers and actuated by the drive chains for operating said scrapers.

10. In a loading machine of the class described, a truck, a frame thereon, a conveying mechanism extending longitudinally over said frame and truck, a plurality of gathering devices on the forward end of said frame each comprising a guide arm pivotally mounted to each side of said frame and projecting outwardly therefrom, a scraper reciprocably movable in each guide arm, and drive means for moving said scrapers reciprocably along said guide arms and simultaneously reciprocating said guide arms about their axes.

11. In a loading machine of the class described, a truck, a frame thereon, a conveying mechanism extending longitudinally over said frame and truck, a plurality of gathering devices on the forward end of said frame each comprising a guide arm pivotally mounted to each side of said frame and projecting outwardly therefrom, a scraper reciprocably movable in each guide arm, a holding member pivoted at the inner end of each of said guide arms adaptable to catch and hold said scraper, and drive means for moving said scrapers reciprocably along said arms and turning said scrapers about the axis of said holding member when held thereby.

12. In a loading machine of the class described, a truck, a frame thereon, a conveying mechanism extending longitudinally over said frame and truck, a plurality of gathering devices on the forward end of said frame each comprising a guide arm pivotally mounted to each side of said frame and projecting outwardly therefrom, a scraper reciprocably movable along each guide arm, drive means for reciprocably moving said scapers along said guide arms and turning said scrapers about a vertical axis as said scrapers reach the inner extremities of said guide arms, said drive means simultaneously reciprocably moving said guide arms about their axis as said scrapers reciprocably move along said guide arms.

13. In a loading machine of the class described, a truck, a frame thereon, a conveying mechanism extending longitudinally over said frame and truck, a pan extending forwardly from said conveying mechanism and to each side thereof, said pan being inclined forwardly and laterally in position to engage the mine bottom, and gathering means on each side of the forward portion of said conveying mechanisms comprising an inclined transversely disposed arcuately movable guide arm and a draft operated scraper reciprocably movable therealong, the incline of said guide arm being such as to conform to the incline of said pan.

14. In a loading machine of the class described, a truck, a frame thereon, a conveying mechanism extending over said frame and truck, a plurality of gathering devices on the forward end of said frame each comprising a guide arm pivotally mounted to each side of said frame and projecting outwardly therefrom, a scraper reciprocably movable in each guide arm, and drive means for moving said scrapers reciprocably along said guide arms and simultaneously reciprocating said guide arms about their axes including a member connectible with each guide arm having means thereon for adjusting the initial angular deflection of said guide arms with respect to said frame.

15. In a loading machine of the class described, a truck, a frame thereon, a conveying mechanism extending over said frame and truck, a plurality of gathering devices on the forward end of said frame each comprising a guide arm pivotally mounted to each side of said frame and projecting outwardly therefrom, a scraper reciprocably movable in each guide arm, and drive means for moving said scrapers reciprocably along said guide arms and simultaneously reciprocating said guide arms about their axes including a member connectible with each guide arm near the inner end thereof having means thereon for adjusting the initial angular deflection of said guide arms with respect to said frame.

16. In a loading machine of the class described, a truck, a frame thereon, a conveying mechanism extending over said frame and truck, a plurality of gathering devices on the forward end of said frame each comprising a guide arm pivotally mounted to each side of said frame and projecting outwardly therefrom, a scraper reciprocably movable in each guide arm, and drive means for moving said scrapers reciprocably along said guide arms and simultaneously reciprocating said guide arms about their axes including a sector connectible with each guide arm near the inner end thereof, and a connecting rod for connecting said drive means for reciprocating said guide arms about their axes with said sector at various points thereon for varying the initial angular deflection of said guide arm with respect to said frame.

Signed at Davenport, in the county of Polk and State of Florida, this 3rd day of August, A. D. 1927.

CHARLES E. DAVIS.